US008949455B2

(12) United States Patent
Idicula et al.

(10) Patent No.: US 8,949,455 B2
(45) Date of Patent: Feb. 3, 2015

(54) PATH-CACHING MECHANISM TO IMPROVE PERFORMANCE OF PATH-RELATED OPERATIONS IN A REPOSITORY

(75) Inventors: Sam Idicula, San Jose, CA (US); Nipun Agarwal, Santa Clara, CA (US); Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1165 days.

(21) Appl. No.: 11/284,521

(22) Filed: Nov. 21, 2005

(65) Prior Publication Data

US 2007/0118561 A1    May 24, 2007

(51) Int. Cl.
G06F 15/173    (2006.01)
G06F 17/30    (2006.01)

(52) U.S. Cl.
CPC ............................... *G06F 17/30091* (2013.01)
USPC ................................. 709/238; 707/3; 707/100

(58) Field of Classification Search
CPC ..................... G06F 17/30091; G06F 17/30221
USPC ................. 707/10, 1, 3, 100; 702/2; 395/425; 709/238
See application file for complete search history.

(56) References Cited

U.S. PATENT DOCUMENTS

| 4,558,413 A | 12/1985 | Schmidt et al. |
| 4,993,025 A | 2/1991 | Vesel et al. |
| 5,151,989 A * | 9/1992 | Johnson et al. ................. 707/10 |
| 5,202,982 A | 4/1993 | Gramlich et al. |
| 5,210,686 A | 5/1993 | Jernigan |
| 5,222,242 A | 6/1993 | Choi et al. |

(Continued)

FOREIGN PATENT DOCUMENTS

| EP | 856803 A2 | 8/1998 |
| EP | 0856803 A2 | 8/1998 |

(Continued)

OTHER PUBLICATIONS

IBM, "A method for faster searches of external file properties using negative caching of directory relationships", IBM Corporation, IBM technical Disclosure Bulletin, dated Jan. 1, 2001, 2 pages.

(Continued)

*Primary Examiner* — Krista Zele
*Assistant Examiner* — James Forman
(74) *Attorney, Agent, or Firm* — Hickman Palermo Truong Becker Bingham Wong LLP

(57) ABSTRACT

A method and apparatus for processing path-based database operations is provided. According to one aspect, a path cache is maintained. For each hierarchical node that is traversed during a path-determining operation, it is determined whether a cache entry corresponding to that node is already contained in the path cache. If such a cache entry is already contained in the path cache, then the path indicated in that cache entry is used to complete the pathname for the node for which the operation is being performed. As a result, hierarchically higher nodes do not need to be traversed to complete the operation. Alternatively, if such a cache entry is not already contained in the path cache, then a cache entry for the node currently being traversed is generated and inserted into the path cache for use in subsequent path-determining operations.

20 Claims, 6 Drawing Sheets

(56) References Cited

U.S. PATENT DOCUMENTS

| | | |
|---|---|---|
| 5,226,137 A | 7/1993 | Bolan et al. |
| 5,247,658 A | 9/1993 | Barrett et al. |
| 5,257,366 A | 10/1993 | Adair et al. |
| 5,295,256 A | 3/1994 | Bapat |
| 5,295,261 A | 3/1994 | Simonetti |
| 5,307,490 A | 4/1994 | Davidson et al. |
| 5,313,629 A | 5/1994 | Abraham et al. ............ 395/600 |
| 5,327,556 A | 7/1994 | Mohan et al. ................ 395/600 |
| 5,369,763 A | 11/1994 | Biles |
| 5,379,422 A | 1/1995 | Antoshenkov |
| 5,388,257 A | 2/1995 | Bauer ........................ 395/600 |
| 5,390,318 A * | 2/1995 | Ramakrishnan et al. ..... 711/158 |
| 5,404,513 A | 4/1995 | Powers et al. |
| 5,437,029 A * | 7/1995 | Sinha ........................ 707/200 |
| 5,454,101 A | 9/1995 | Mackay et al. |
| 5,463,772 A | 10/1995 | Thompson et al. |
| 5,467,471 A | 11/1995 | Bader |
| 5,493,682 A | 2/1996 | Tyra et al. |
| 5,499,358 A | 3/1996 | Nevarez |
| 5,499,371 A | 3/1996 | Henninger et al. |
| 5,504,892 A | 4/1996 | Atsatt et al. |
| 5,506,991 A | 4/1996 | Curry et al. |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,561,763 A | 10/1996 | Eto et al. |
| 5,566,328 A | 10/1996 | Eastep |
| 5,566,331 A | 10/1996 | Irwin, Jr. et al. |
| 5,566,337 A | 10/1996 | Szymanski et al. |
| 5,574,915 A | 11/1996 | Lemon et al. |
| 5,625,815 A | 4/1997 | Maier et al. |
| 5,630,125 A | 5/1997 | Zellweger |
| 5,643,633 A | 7/1997 | Telford et al. |
| 5,649,200 A | 7/1997 | Leblang et al. |
| 5,675,802 A | 10/1997 | Allen et al. |
| 5,680,614 A | 10/1997 | Bakuya et al. |
| 5,682,524 A | 10/1997 | Freund et al. |
| 5,684,990 A | 11/1997 | Boothby |
| 5,689,706 A | 11/1997 | Rao et al. |
| 5,706,510 A | 1/1998 | Burgoon |
| 5,724,577 A | 3/1998 | Exley et al. |
| 5,729,689 A | 3/1998 | Allard et al. |
| 5,734,887 A | 3/1998 | Kingberg et al. |
| 5,737,736 A | 4/1998 | Chang |
| 5,758,153 A | 5/1998 | Atsatt et al. |
| 5,778,354 A | 7/1998 | Leslie et al. |
| 5,802,518 A | 9/1998 | Karaev et al. |
| 5,806,078 A | 9/1998 | Hug et al. |
| 5,819,275 A | 10/1998 | Badger et al. |
| 5,822,511 A | 10/1998 | Kashyap et al. |
| 5,832,526 A | 11/1998 | Schuyler |
| 5,838,965 A | 11/1998 | Kavanagh et al. |
| 5,842,212 A | 11/1998 | Ballurio et al. |
| 5,842,214 A * | 11/1998 | Whitney et al. ................ 707/10 |
| 5,848,246 A | 12/1998 | Gish |
| 5,852,747 A | 12/1998 | Bennett et al. |
| 5,864,870 A | 1/1999 | Guck |
| 5,870,590 A | 2/1999 | Kita et al. |
| 5,878,415 A | 3/1999 | Olds |
| 5,878,434 A | 3/1999 | Draper et al. |
| 5,892,535 A | 4/1999 | Allen et al. |
| 5,897,638 A | 4/1999 | Lasser et al. |
| 5,905,990 A | 5/1999 | Inglett |
| 5,915,253 A | 6/1999 | Christiansen |
| 5,918,225 A | 6/1999 | White et al. |
| 5,921,582 A | 7/1999 | Gusack |
| 5,924,088 A | 7/1999 | Jakobsson et al. |
| 5,937,406 A | 8/1999 | Balabine et al. ............ 707/100 |
| 5,940,591 A | 8/1999 | Boyle et al. |
| 5,960,194 A | 9/1999 | Choy et al. |
| 5,974,407 A | 10/1999 | Sacks |
| 5,978,791 A | 11/1999 | Farber et al. |
| 5,983,215 A | 11/1999 | Ross et al. |
| 5,983,277 A | 11/1999 | Heile et al. |
| 5,987,506 A | 11/1999 | Carter et al. |
| 5,991,771 A | 11/1999 | Falls et al. |
| 6,003,040 A | 12/1999 | Mital et al. |
| 6,008,806 A | 12/1999 | Nakajima et al. |
| 6,023,706 A | 2/2000 | Schmuck et al. |
| 6,023,765 A | 2/2000 | Kuhn |
| 6,026,402 A | 2/2000 | Vossen et al. |
| 6,029,160 A | 2/2000 | Cabrera et al. |
| 6,029,162 A | 2/2000 | Schultz |
| 6,029,166 A | 2/2000 | Mutalik et al. |
| 6,029,175 A | 2/2000 | Chow et al. |
| 6,038,563 A | 3/2000 | Bapat et al. |
| 6,052,122 A | 4/2000 | Sutcliffe et al. |
| 6,055,527 A * | 4/2000 | Badger et al. ..................... 707/2 |
| 6,055,544 A | 4/2000 | DeRose et al. |
| 6,061,684 A | 5/2000 | Glasser et al. |
| 6,088,694 A | 7/2000 | Burns et al. |
| 6,092,086 A | 7/2000 | Martin et al. |
| 6,112,209 A | 8/2000 | Gusack |
| 6,115,741 A | 9/2000 | Domenikos et al. |
| 6,119,118 A | 9/2000 | Kain, III et al. |
| 6,122,645 A | 9/2000 | Bohannon et al. |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,185,574 B1 | 2/2001 | Howard et al. |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmone |
| 6,212,512 B1 | 4/2001 | Barney et al. |
| 6,212,557 B1 | 4/2001 | Oran |
| 6,230,310 B1 | 5/2001 | Arrouye et al. |
| 6,233,729 B1 | 5/2001 | Campara et al. |
| 6,236,988 B1 | 5/2001 | Aldred |
| 6,247,024 B1 | 6/2001 | Kincaid |
| 6,263,332 B1 | 7/2001 | Nasr et al. |
| 6,269,380 B1 | 7/2001 | Terry et al. |
| 6,269,431 B1 | 7/2001 | Dunham |
| 6,279,006 B1 | 8/2001 | Shigemi et al. |
| 6,279,007 B1 * | 8/2001 | Uppala ........................ 707/101 |
| 6,298,349 B1 | 10/2001 | Toyoshima et al. |
| 6,301,592 B1 | 10/2001 | Aoyama et al. |
| 6,301,605 B1 | 10/2001 | Napolitano et al. |
| 6,308,168 B1 | 10/2001 | Dovich et al. |
| 6,321,219 B1 | 11/2001 | Gainer et al. |
| 6,330,573 B1 | 12/2001 | Salisbury et al. |
| 6,332,200 B1 | 12/2001 | Meth et al. |
| 6,339,382 B1 | 1/2002 | Arbinger et al. |
| 6,341,289 B1 | 1/2002 | Burroughs et al. |
| 6,343,287 B1 | 1/2002 | Kumar et al. |
| 6,349,295 B1 | 2/2002 | Tedesco et al. |
| 6,356,920 B1 | 3/2002 | Vandersluis |
| 6,366,902 B1 | 4/2002 | Lyle et al. |
| 6,366,921 B1 | 4/2002 | Hansen et al. |
| 6,366,934 B1 | 4/2002 | Cheng et al. |
| 6,370,537 B1 | 4/2002 | Gilbert et al. |
| 6,370,548 B1 | 4/2002 | Bauer et al. |
| 6,381,607 B1 | 4/2002 | Wu et al. |
| 6,385,644 B1 | 5/2002 | Devine et al. |
| 6,389,427 B1 | 5/2002 | Faulkner |
| 6,389,433 B1 | 5/2002 | Bolosky et al. |
| 6,393,435 B1 | 5/2002 | Gartner et al. |
| 6,393,456 B1 | 5/2002 | Ambler et al. |
| 6,397,231 B1 | 5/2002 | Salisbury et al. |
| 6,421,692 B1 | 7/2002 | Milne et al. |
| 6,427,123 B1 * | 7/2002 | Sedlar .............................. 702/2 |
| 6,438,550 B1 | 8/2002 | Doyle et al. |
| 6,438,562 B1 | 8/2002 | Gupta et al. |
| 6,442,548 B1 | 8/2002 | Balabine et al. |
| 6,446,091 B1 | 9/2002 | Noren et al. |
| 6,470,344 B1 | 10/2002 | Kothuri et al. |
| 6,470,345 B1 | 10/2002 | Doutre et al. |
| 6,473,407 B1 | 10/2002 | Ditmer et al. |
| 6,487,546 B1 | 11/2002 | Witkowski |
| 6,487,547 B1 | 11/2002 | Ellison et al. |
| 6,496,842 B1 | 12/2002 | Lyness |

(56) References Cited

U.S. PATENT DOCUMENTS

| | | |
|---|---|---|
| 6,502,102 B1 | 12/2002 | Haswell et al. |
| 6,505,212 B2 | 1/2003 | Nakano et al. |
| 6,519,597 B1 | 2/2003 | Cheng et al. |
| 6,535,970 B1 * | 3/2003 | Bills et al. ..................... 711/207 |
| 6,539,398 B1 | 3/2003 | Hannan et al. |
| 6,542,898 B1 | 4/2003 | Sullivan et al. |
| 6,546,422 B1 * | 4/2003 | Isoyama et al. ............... 709/225 |
| 6,547,829 B1 | 4/2003 | Meyerzon et al. |
| 6,549,916 B1 | 4/2003 | Sedlar |
| 6,571,231 B2 | 5/2003 | Sedlar |
| 6,594,675 B1 | 7/2003 | Schneider |
| 6,604,100 B1 | 8/2003 | Fernandez et al. |
| 6,604,236 B1 | 8/2003 | Draper et al. |
| 6,609,121 B1 | 8/2003 | Ambrosini et al. |
| 6,611,843 B1 | 8/2003 | Jacobs |
| 6,631,366 B1 | 10/2003 | Nagavamsi et al. |
| 6,631,402 B1 | 10/2003 | Devine et al. |
| 6,636,845 B2 | 10/2003 | Chau et al. |
| 6,643,633 B2 | 11/2003 | Chau et al. |
| 6,654,734 B1 | 11/2003 | Mani et al. |
| 6,681,221 B1 | 1/2004 | Jacobs |
| 6,684,227 B2 | 1/2004 | Duxbury |
| 6,697,805 B1 | 2/2004 | Choquier et al. |
| 6,701,514 B1 | 3/2004 | Haswell et al. |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,725,212 B2 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,778,977 B1 | 8/2004 | Avadhanam et al. |
| 6,782,380 B1 | 8/2004 | Thede |
| 6,785,673 B1 | 8/2004 | Fernandez et al. |
| 6,795,821 B2 | 9/2004 | Yu |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,920,457 B2 | 7/2005 | Pressmar |
| 6,947,991 B1 | 9/2005 | Burton et al. |
| 6,959,416 B2 | 10/2005 | Manning et al. |
| 6,965,894 B2 | 11/2005 | Leung et al. |
| 6,965,903 B1 | 11/2005 | Agarwal et al. |
| 6,970,975 B2 * | 11/2005 | Frank .......................... 711/118 |
| 6,973,455 B1 | 12/2005 | Vahalia et al. |
| 6,983,322 B1 | 1/2006 | Tripp et al. |
| 7,031,956 B1 | 4/2006 | Lee et al. |
| 7,043,472 B2 | 5/2006 | Aridor et al. |
| 7,062,507 B2 | 6/2006 | Wang et al. |
| 7,089,239 B1 | 8/2006 | Baer et al. |
| 7,100,195 B1 | 8/2006 | Underwood |
| 7,117,216 B2 | 10/2006 | Chakraborty et al. |
| 7,139,746 B2 | 11/2006 | Shin et al. |
| 7,139,747 B1 | 11/2006 | Najork |
| 7,162,485 B2 | 1/2007 | Gottlob et al. |
| 7,171,404 B2 | 1/2007 | Lindblad et al. |
| 7,171,407 B2 * | 1/2007 | Barton et al. ..................... 707/4 |
| 7,174,328 B2 | 2/2007 | Stanoi et al. |
| 7,185,013 B2 * | 2/2007 | Burnett ............................. 1/1 |
| 7,216,127 B2 | 5/2007 | Auerbach |
| 7,228,299 B1 * | 6/2007 | Harmer et al. ................ 707/741 |
| 7,269,601 B2 | 9/2007 | Kinno et al. |
| 7,359,934 B1 * | 4/2008 | Ricart et al. .................. 709/203 |
| 7,475,061 B2 | 1/2009 | Bargeron et al. |
| 7,505,985 B2 | 3/2009 | Kilroy |
| 7,630,971 B2 * | 12/2009 | Arrouye et al. ..................... 1/1 |
| 7,752,226 B1 * | 7/2010 | Harmer et al. ................ 707/796 |
| 7,945,577 B2 * | 5/2011 | Altinel et al. ................. 707/769 |
| 2001/0049675 A1 | 12/2001 | Mandler et al. |
| 2002/0056025 A1 | 5/2002 | Qiu et al. |
| 2002/0073019 A1 | 6/2002 | Deaton |
| 2002/0078068 A1 | 6/2002 | Krishnaprasad et al. |
| 2002/0095421 A1 | 7/2002 | Koskas |
| 2002/0116371 A1 | 8/2002 | Dodds et al. |
| 2002/0116457 A1 | 8/2002 | Eshleman et al. |
| 2002/0133484 A1 | 9/2002 | Chau et al. |
| 2002/0143512 A1 | 10/2002 | Shamoto et al. |
| 2002/0143755 A1 | 10/2002 | Wynblatt et al. |
| 2002/0152267 A1 | 10/2002 | Lennon |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2003/0004937 A1 | 1/2003 | Salmenkaita et al. |
| 2003/0009361 A1 | 1/2003 | Hancock et al. |
| 2003/0033285 A1 * | 2/2003 | Jalali et al. ........................ 707/1 |
| 2003/0065659 A1 | 4/2003 | Agarwal et al. |
| 2003/0078906 A1 | 4/2003 | Ten-Hove et al. |
| 2003/0084056 A1 | 5/2003 | DeAnna et al. |
| 2003/0093672 A1 | 5/2003 | Cichowlas |
| 2003/0101194 A1 | 5/2003 | Rys et al. |
| 2003/0105732 A1 | 6/2003 | Kagalwala et al. |
| 2003/0131051 A1 | 7/2003 | Lection et al. |
| 2003/0172135 A1 | 9/2003 | Bobick et al. |
| 2003/0177341 A1 | 9/2003 | Devillers |
| 2003/0182624 A1 | 9/2003 | Large |
| 2003/0212662 A1 | 11/2003 | Shin et al. |
| 2003/0212664 A1 | 11/2003 | Breining et al. |
| 2003/0233618 A1 | 12/2003 | Wan |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 | 4/2004 | Manikutty et al. |
| 2004/0073541 A1 | 4/2004 | Lindblad et al. |
| 2004/0083222 A1 | 4/2004 | Pecherer |
| 2004/0088320 A1 | 5/2004 | Perry |
| 2004/0103105 A1 | 5/2004 | Lindblad et al. |
| 2004/0103282 A1 | 5/2004 | Meier et al. |
| 2004/0148278 A1 | 7/2004 | Milo et al. |
| 2004/0167864 A1 | 8/2004 | Wang et al. |
| 2004/0176958 A1 | 9/2004 | Salmenkaita et al. |
| 2004/0205551 A1 | 10/2004 | Santos |
| 2004/0220912 A1 | 11/2004 | Manikutty et al. |
| 2004/0221226 A1 | 11/2004 | Lin et al. |
| 2004/0225680 A1 | 11/2004 | Cameron et al. |
| 2004/0230667 A1 | 11/2004 | Wookey |
| 2004/0230893 A1 | 11/2004 | Elza et al. |
| 2004/0267760 A1 | 12/2004 | Brundage et al. |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0055343 A1 | 3/2005 | Krishnamurthy |
| 2005/0091188 A1 | 4/2005 | Pal et al. |
| 2005/0097084 A1 | 5/2005 | Balmin et al. |
| 2005/0097108 A1 | 5/2005 | Wang et al. |
| 2005/0102256 A1 | 5/2005 | Bordawekar et al. |
| 2005/0114314 A1 | 5/2005 | Fan et al. |
| 2005/0120031 A1 | 6/2005 | Ishii |
| 2005/0160108 A1 | 7/2005 | Charlet et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0257201 A1 | 11/2005 | Rose et al. |
| 2005/0289125 A1 | 12/2005 | Liu et al. |
| 2005/0289138 A1 | 12/2005 | Cheng et al. |
| 2006/0059204 A1 * | 3/2006 | Borthakur et al. ............ 707/200 |
| 2006/0074925 A1 * | 4/2006 | Bixby et al. ................... 707/100 |
| 2006/0195420 A1 | 8/2006 | Kilroy |
| 2006/0195421 A1 | 8/2006 | Kilroy |
| 2006/0195427 A1 | 8/2006 | Kilroy |
| 2007/0250480 A1 | 10/2007 | Najork |
| 2009/0222450 A1 | 9/2009 | Zigelman |

FOREIGN PATENT DOCUMENTS

| | | |
|---|---|---|
| EP | 1 241 589 A2 | 9/2002 |
| GB | 2409078 A | 6/2005 |
| JP | 07-085102 | 3/1995 |
| JP | 07085102 | 3/1995 |
| WO | WO 97/46956 | 12/1997 |
| WO | WO 98/00795 | 1/1998 |

(56) References Cited

FOREIGN PATENT DOCUMENTS

| WO | WO 00/14632 | 3/2000 |
|---|---|---|
| WO | WO 00/49533 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

European Patent Office, "Communication Pursuant to Article 96(2) EPC," App. No. 00952215.2, dated Oct. 5, 2006, received on Oct. 13, 2006, 7 pages.
Amended Claims, EP App. 00952215.2, 26 pages.
"Notice of Allowance and Fee Due" received in U.S. Appl. No. 10/944,170 dated Apr. 7, 2008, 8 pages.
MacKenzie, David et al., "Finding Files", GNU Findutils Version 4.1.2, Nov. 1994, 38 pages.
Arthur et al., UNIX Shell Programming, 4th edition, John Wiley & Sons, Inc., 1997, pp. 77, 103 and 104.
Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.
Bourret, R., et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.
Braga, Daniele et al, "A Graphical Environment to Query XML Data with Query," Proceedings of the Fourth International Conference on Web Information Systems Engineering (WISE '03), 2003, IEEE, 10 pages.
Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.
Chakraborty, Krishnendu, "The XML Garbage Collector", The Source for Developers, Sun Developer Network Site XP-002297849, Mar. 2002.
Chen, Ruey-Shun et al., "Developing an XML framework for metadata system", Trinity College Dublin, Proc. of the 1st Inter. Sympo. on Information and Communication, pp. 267-272.
Cheng, Josephine, et al., "IBM DB2 XML Extender," IEEE, ICDE '00 Conference, San Diego, Feb. 2000, 128 pages.
Cooper, Brian F. et al., "A Fast Index for Semistructured Data," Proceeding of the International Conference on Very Large Databases, 2001, XP-002303292, pp. 341-350.
Jajodia, Sushil, et al., "Toward a Multilevel Secure Relational Data Model," ACM, 1991, 8393 SIGMOD Record, Jun. 20, 1991, No. 2, New York, US, XP-000364619, pp. 50-59.
Lo et al., "XAS: A System for Accessing Componentized, Virtual XML Documents," IEEE, 2001, pp. 493-502.
Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.
McHugh, Jason et al., "Query Optimization for XML", XP-002333353, Proceedings of the 25th VLDB Conference (1999) pp. 315-326.
McHugh, Jason, et al. "Indexing Semistructured Data," Stanford Science Department, 1998, XP-002248313, pp. 1-21.
Myllymaki, Jussi, "Effective Wed data Extraction with Standard XML Technologies," WWW10, May 1-5, 2001, pp. 689-696.
Noser, Hansrudi et al., "Dynamic 3D Visualization of Database-Defined Tree Structures on the WWW by Using Rewriting Systems," 2000, IEEE, XP-002262516, pp. 247-254.
Oracle, "Oracle iFS (Internet File System)," Mar. 1999, XP-002204710, 3 pages.
Park, Joon S., "Towards Secure Collaboration on the Semantic Web" (2003) ACM Press, vol. 33, Issue 2, pp. 1-10.

Peng, Feng et al., "XPath queries on streaming data" (2003) ACM Press, pp. 431-442.
Rao , Herman Chung-Hwa, et al., "An Overview of the Internet File System," 1997, IEEE, XP-002204711, pp. 474-477.
Ricardo, Catherine, "Database Systems: Principles, Design, & Implementation," 1990, MacMillian Publishing Co., pp. 357-361, 379-380.
Schmidt et al., "Why and How to Benchmark XML Databases," SIGMOND Record, vol. 3, No. 3, Sep. 2001, pp. 27-32.
Thekkath, Chandramohan A. et al., "Implementing network protocols at user level" (1993) ACM Press, pp. 64-73.
Vion-Dury, Jean-Yves, "XPath on left and right sides of rules: toward compact XML tree rewriting through node patterns" (2003) ACM Press, pp. 19-25.
Vorthmann, S., et al. "Beyond Schemas, Schema Adjuncts and the Outside World," Markup Languages, Online!, vol. 2, No. 3, Jun. 2000, pp. 1-8.
Wallach, Deborah A. et al., "ASHs: Application-specific handlers for high-performance messaging" (1996) ACM Press, pp. 1-13.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
Zisman et al., "Using XML to Build Consistency Rules for Distributed Specifications," Proceedings of the Tenth International Workshop on Software Specification and Design (IWSD'00), IEEE 2000, 8 pages.
International Preliminary Examination Report, Application No. PCT/US03/35551, pp. 1-17.
Current claims in PCT/US03/35551, pp. 20-23.
Written Opinion, Application No. PCT/US03/35551.
Current claims in PCT/US03/35551, pp. 1-4.
Jurgens, Marcus, et al., "PISA: Performance Models for Index Structures with and without Aggregated data", German Research Society, 1999, 7 pages.
Pal, Shankar et al., "Indexing XML Data Stored in a Relational Database", Proceedings of the 30th VLDB Conference, 2004, 12 pages.
Girardot et al., "Millau: an encoding format for efficient representation and exchange of XML over the Web", IBM Almaden Research Center, 24 pages.
Shankar Pal et al., "Indexing XML Data Stored in a Relational Database", Proceedings of the 30th VLDB Conference, 2004, 12 pages.
Mackenzie et al., "Finding Files", FindUtils, Version 4.1.2, Source Code, GNU.org, Nov. 1997, source files, code. C, 22 pages.
Cormen et al., "Introduction to Algorithms", MIT Press, 2001, 2nd Edition, 4 pages.
European Patent Office, "Communication pursuant to Article 94 (3) EPC", European patent application 05732473.3-1225, dated Feb. 4, 2008, 7 pages.
State Intellectual Property Office of P.R.C., "Notification of the First Office Action", European patent application 2005800186273.9, dated Oct. 12, 2007, 9 pages.
Claims, European patent application 2005800186273.9, 3 pages.
Claims, European patent application 05732473.3-1225, 3 pages.
Japanese Patent Office, "Questioning (Office Action)" with "Pending Claims" attached, Foreign Patent Application No. 600202/2000, received Apr. 28, 2008, 9 pages.
Douglas et al., "Elephant: The File System That Never Forgets," In Proceedings of the IEEE Workshop on Hopt Topics in Operating Systems (HotOS VII), Mar. 1999. 6 pages.
Canadian Office Action received in Application No. 2,646,776 dated Dec. 23, 2009 (4 pages).
Current Claims of Application No. 2,646,776, Dec. 2009 (3 pages).
U.S. Appl. No. 09/571,696, filed May 15, 2000, Advisory Action, Sep. 2, 2009.
U.S. Appl. No. 10/848,653, filed May 18, 2004, Notice of Allowance, Mar. 23, 2012.
U.S. Appl. No. 12/049,212, filed Mar. 14, 2008, Notice of Allowance, Jan. 8, 2014.

\* cited by examiner

FILES TABLE 210

| Row ID | File ID | Name | Body | Modification Date... |
|---|---|---|---|---|
| R1 | X1 | / | (NULL) | |
| R2 | X2 | Windows | (NULL) | |
| R3 | X3 | Word | (NULL) | |
| R4 | X4 | Example.doc | BLOB | |
| R5 | X5 | Access | (NULL) | |
| R6 | X6 | Unix | (NULL) | |
| R7 | X7 | App1 | (NULL) | |
| R8 | X8 | App2 | (NULL) | |
| R9 | X9 | VMS | (NULL) | |
| R10 | X10 | App3 | (NULL) | |
| R11 | X11 | App4 | (NULL) | |
| R12 | X12 | Example.doc | BLOB | |

Fig. 2 (PRIOR ART)

DIRECTORY_LINKS TABLE 310

| Parent ID | Child ID | Child_Name |
|---|---|---|
| X1 | X2 | Windows |
| X2 | X3 | Word |
| X3 | X4 | Example.doc |
| X2 | X5 | Access |
| X1 | X6 | Unix |
| X6 | X7 | App1 |
| X6 | X8 | App2 |
| X1 | X9 | VMS |
| X9 | X10 | App3 |
| X9 | X11 | App4 |
| X11 | X12 | Example.doc |

Fig. 3  (PRIOR ART)

PATH-CACHING MECHANISM TO IMPROVE PERFORMANCE OF PATH-RELATED OPERATIONS IN A REPOSITORY

RELATED CASES

The present application is related to U.S. Pat. No. 6,427,123, titled "HIERARCHICAL INDEXING FOR ACCESSING HIERARCHICALLY ORGANIZED INFORMATION IN A RELATIONAL SYSTEM", filed Feb. 18, 1999; U.S. patent application Ser. No. 09/571,696, titled "VERSIONING IN INTERNET FILE SYSTEM", filed May 15, 2000; U.S. patent application Ser. No. 10/259,176, titled "MECHANISM FOR UNIFORM ACCESS CONTROL IN A DATABASE SYSTEM", filed Sep. 27, 2003; U.S. patent application Ser. No. 10/260,381, titled "MECHANISM TO EFFICIENTLY INDEX STRUCTURED DATA THAT PROVIDES HIERARCHICAL ACCESS IN A RELATIONAL DATABASE SYSTEM", filed Sep. 27, 2002; U.S. patent application Ser. No. 10/306,485, titled "TECHNIQUES FOR MANAGING HIERARCHICAL DATA WITH LINK ATTRIBUTES IN A RELATIONAL DATABASE", filed Nov. 26, 2002; U.S. patent application Ser. No. 10/884,311, titled "INDEX FOR ACCESSING XML DATA", filed Jul. 2, 2004; U.S. patent application Ser. No. 10/944,177, titled "INDEX MAINTENANCE FOR OPERATIONS INVOLVING INDEXED XML DATA", filed Sep. 16, 2004; U.S. patent application Ser. No. 10/944,170, titled "EFFICIENT QUERY PROCESSING OF XML DATA USING XML INDEX", filed Sep. 16, 2004; U.S. patent application Ser. No. 10/452,164, titled "TRANSACTION-AWARE CACHING FOR ACCESS CONTROL METADATA", filed May 30, 2003; U.S. patent application Ser. No. 10/452,163, titled "TRANSACTION-AWARE CACHING FOR FOLDER PATH DATA", filed May 30, 2003; U.S. patent application Ser. No. 09/728,909, titled "HIERARCHY-BASED SECURED DOCUMENT REPOSITORY", filed Dec. 1, 2000; and U.S. patent application Ser. No. 10/999,864, titled "PROCESSING PATH-BASED DATABASE OPERATIONS", filed Nov. 29, 2004. The contents of all of the previously filed patents and patent applications mentioned in this paragraph are hereby incorporated by reference in their entirety for all purposes as if fully set forth herein.

FIELD OF THE INVENTION

The present invention relates to databases, and in particular, to processing path-based database operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Emulating a Hierarchical File System in a Relational Database System

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

An information hierarchy is typically made up of nodes. The highest node in the hierarchy is referred to as a "root" node. The nodes at the end of each branch in the hierarchy are "leaf" nodes. The nodes between the root node and the leaf nodes are "intermediate" nodes.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to a root directory. Each of directories 110, 114, 116, 120, 124, 126, and each of documents 118 and 122, is a separate node in the directory hierarchy.

As is discussed below, a file directory tree is an example of an information hierarchy with nodes. In the case of a file directory tree, the nodes correspond to directories. Other kinds of information hierarchies, in which the nodes correspond to various other items, can also be conceived. In the discussion below, for convenience of expression, items that correspond to nodes are sometimes referred to as the nodes themselves (e.g., rather than saying "the item that corresponds to node X," the discussion below may simply say, "node X" when referring to that item. For example, a directory that corresponds to a node may be referred to as the node to which the directory corresponds.

In an information hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of file names in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used. UNIX file systems only allow hard links to files (not directories).

In contrast to hierarchical approaches to organizing electronic information, a relational database stores information in tables comprised of rows and columns. Each row is identified by a unique row ID. Each column represents an attribute of a record, and each row represents a particular record. Data is retrieved from the database by submitting queries to a database management system (DBMS) that manages the database.

Each type of storage system has advantages and limitations. A hierarchically organized storage system is simple, intuitive, and easy to implement, and is a standard model used by many application programs. Unfortunately, the simplicity of the hierarchical organization does not provide the support required for complex data retrieval operations. For example, the contents of every directory may have to be inspected to retrieve all documents created on a particular day that have a particular file name. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

Such emulation may be implemented through the use of two relational tables: a "file" table and a "directory links" table. The file table stores information relating to each file in the emulated hierarchical system. For files that are documents, the file table further stores either the body of the file (in the form of a large binary object (BLOB)), or a pointer to the body of the document. The directory links table stores all of the link information that indicates the parent-child relationships between files.

To understand how these two tables may be used to emulate a hierarchical storage system, one may suppose that a file system having the hierarchical structure of FIG. 1 is implemented in a database. The file system of FIG. 1 can be illustrated as follows (a unique ID, shown in parentheses, is assigned by the system to uniquely identify each file):

```
-/(X1)
    -Windows (X2)
        -Word (X3)
            -Example.doc (X4)
        -Access (X5)
    -Unix (X6)
        -App1 (X7)
        -App2 (X8)
    -VMS (X9)
        -App3 (X10)
        -App4 (X11)
            -Example.doc (X12)
```

FIG. 2 shows a files table 210, and FIG. 3 shows a directory links table 310, which may be used by a computer system to emulate the file system of FIG. 1 in a relational database system. Files table 210 contains an entry for each file in the system. Each entry includes a row ID, a file ID, a name, a body column, and a modification date column (plus other system-maintained information such as creation date, access permission information, etc.).

The file ID, also referred to as the "object ID" or "OID," is a unique ID assigned to each file by the system. The name is the name assigned to the file, which does not need to be unique. The body is the field in which the contents of a file are stored. The body field may store the actual contents of a file in the form of a binary large object (BLOB), or a pointer to the contents of the file. Where the entry is for a file having no content (e.g. a directory), the body field is null. In the above example, only the two documents entitled Example.doc have content; thus, the body field for all of the other entries is null.

In directory links table 310, an entry is stored for each link between files in the file system of FIG. 1. Each entry includes a parent ID, a child ID, and a child_name field. For each link, the parent ID field specifies the file which is the parent file for the link, the child ID field specifies the file which is the child file for the link, and the child_name field specifies the name of the child file in the link. Thus, for example, in the entry for the link between root directory 110 and Windows directory 114, directory links table 310 specifies that X1 (the FileID of the root directory) is the parent ID, X2 (the FileID of the Windows directory) is the child ID, and "Windows" is the child_name.

An example of how the information in these two tables may be used to implement the file system of FIG. 1 is described in U.S. Pat. No. 6,427,123, titled "HIERARCHICAL INDEXING FOR ACCESSING HIERARCHICALLY ORGANIZED INFORMATION IN A RELATIONAL SYSTEM", filed Feb. 18, 1999.

Determining Whether a File Exists within a Specified Path

Some operations require a database server to determine whether a particular file exists within a specified path of a file hierarchy. For example, a user of a hierarchical file system implemented as described above might wish to obtain a list of documents that (a) contain a specified keyword and (b) are located within a specified path in the file hierarchy. For example, a user might wish to locate all files that (a) contain the word "Oracle" and (b) are located within the path "/Windows". If both documents 118 and 122 contained the word "Oracle," then the database server would need to determine, for each document, whether that document existed within the path "/Windows".

To start with, the database server might know the file ID for document 118 (i.e., "X4") and the file ID for document 122 (i.e., "X12"). The database server may derive the full pathname for each of documents 118 and 122 by following the links indicated in directory links table 310. For example, to derive the pathname for document 118, the database server scans directory links table 310 for a row that indicates a child ID of "X4". Upon locating the row, the database server determines that the Child_Name in the row is "Example.doc," so the database server prepends "Example.doc" to the front of the currently empty and null pathname. The database server also determines that the row indicates a parent ID of "X3."

Consequently, the database server scans directory links table 310 for a row that indicates a child ID of "X3". Upon locating the row, the database server determines that the Child_Name in the row is "Word," so the database server prepends "Word/" to the front of the pathname, making the pathname "Word/Example.doc". The database server also determines that the row indicates a parent ID of "X2".

Consequently, the database server scans directory links table 310 for a row that indicates a child ID of "X2". Upon locating the row, the database server determines that the Child_Name in the row is "Windows," so the database server prepends "Windows/" to the front of the pathname, making the pathname "Windows/Word/Example.doc". The database server also determines that the row indicates a parent ID of "X1".

Knowing that the node corresponding to the "X1" ID is the root directory "/", the database server prepends "/" to the front of the pathname, making the pathname "/Windows/Word/Example.doc". By performing a string comparison, the database server determines that the pathname "/Windows/Word/Example.doc" falls within the specified pathname "/Windows". Consequently, the database server returns document 118 as a result of the operation described above.

Using the same link table-scanning and link-tracing technique discussed above, the database server determines that the complete pathname for document 122 is "/VMS/App4/Example.doc". By performing a string comparison, the database server determines that the pathname "/VMS/App4/Example.doc" does not fall within the specified pathname "/Windows". Consequently, the database server does not return document 122 as a result of the operation described above.

In performing the technique described above, rather than scanning every row of directory links table 310 when searching for a row with a particular child ID, the database server may scan a B-tree index built on the child ID column of directory links table 310. As a result, each scan may be performed in O(log(N)) time rather than O(N) time. Despite this improvement, when there are many entries in directory links table 310, and when the depth of the file hierarchy is significant, determining whether a particular file exists within a specified path of a file hierarchy can be a prohibitively expensive operation in terms of time.

A faster, more efficient way of determining whether a particular file exists within a specified path of a file hierarchy emulated by a database system is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows a files table that may be used to emulate a hierarchically organized system in a relationally organized system;

FIG. 3 shows a directory links table that may be used in conjunction with the files table of FIG. 2 to emulate a hierarchically organized system;

DETAILED DESCRIPTION

A method and apparatus is described for processing path-based database operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, in order to more efficiently process path-based database operations, such as those described in the foregoing Background section, a path cache is maintained. For each hierarchical node that is traversed during a path-determining operation, it is determined whether a cache entry corresponding to that node is already contained in the path cache. If such a cache entry is already contained in the path cache, then the path indicated in that cache entry is used to complete the pathname for the node for which the operation is being performed. As a result, hierarchically higher nodes do not need to be traversed to complete the operation. Alternatively, if such a cache entry is not already contained in the path cache, then a cache entry for the node currently being traversed is generated and inserted into the path cache for use in subsequent path-determining operations.

Information Hierarchies

A file directory tree is discussed below as an example of an information hierarchy with nodes. In the case of a file directory tree, the nodes correspond to directories. However, the techniques described herein are not limited to file directory trees. Other kinds of information hierarchies, in which the nodes correspond to various items other than directories, can also be conceived. The techniques described herein also may be applied to these other kinds of information hierarchies.

For example, in a node tree that represents an XML document, a node can correspond to an element and the child nodes of the node can correspond to an attribute or another element contained in the element. The node may be associated with a name and value. For example, for a node representing the element "book," the name of the node associated with element "book" might be "book," and the value might be "my book." For a node representing the attribute "publisher," the name of the node might be "publisher," and the value of the node might be "Doubleday." Techniques described herein also may be applied to such a node tree, and to other kinds of information hierarchies not expressly described herein.

Database Architecture

Figure 1:
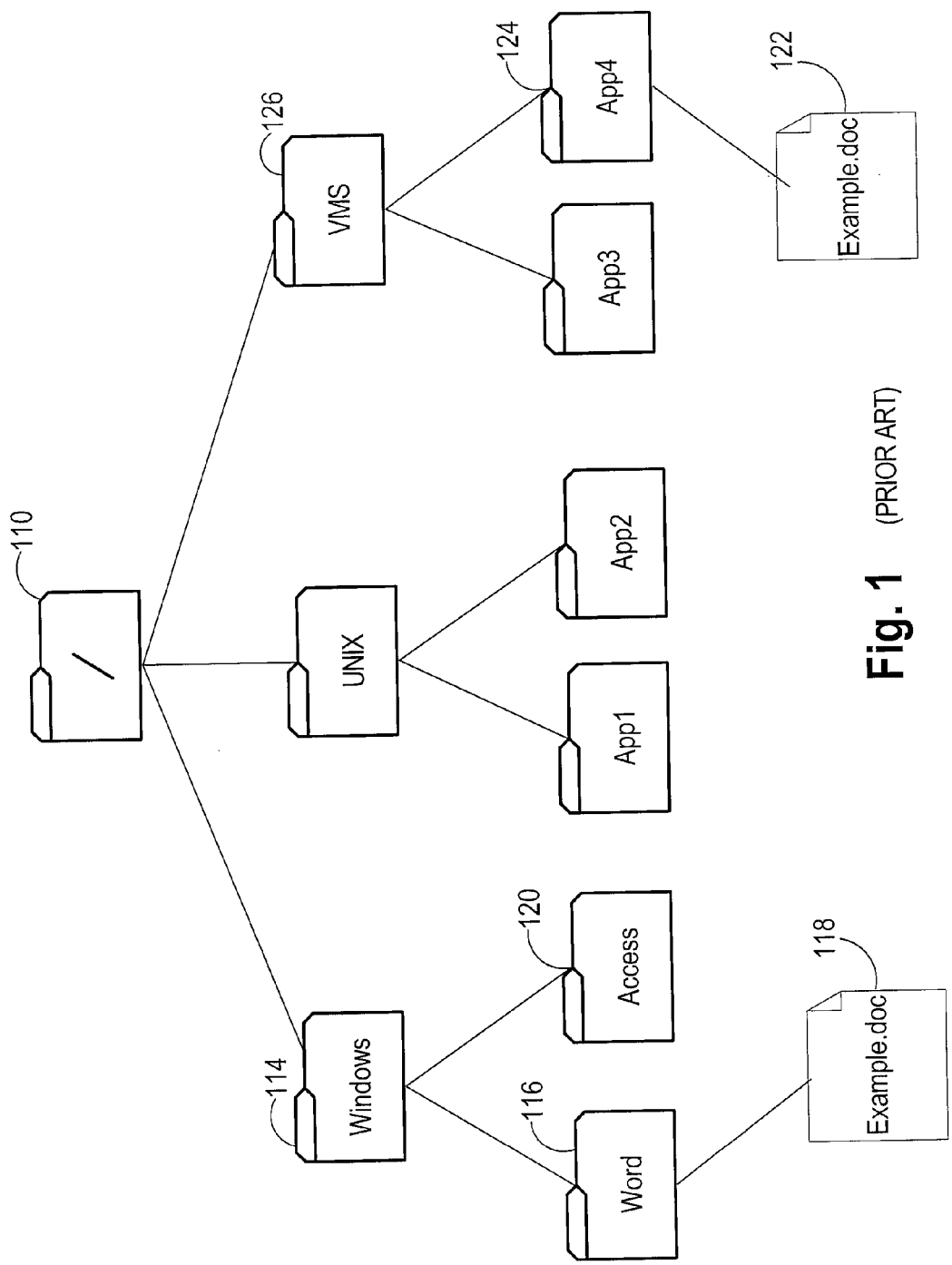
FIG. 1 is a block diagram illustrating a hierarchically organized file system.
Figure 4:
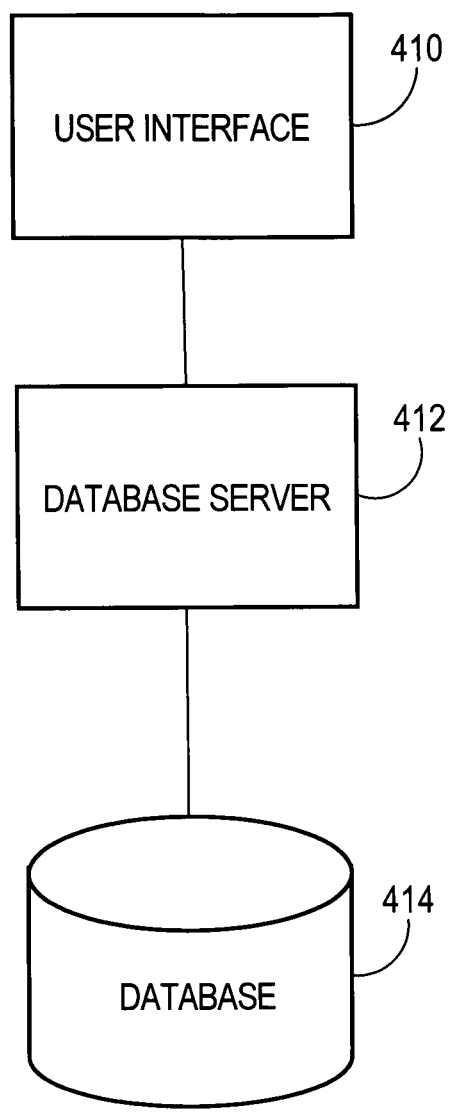
FIG. 4 is a block diagram illustrating a database system that may be used to implement one embodiment of the invention.

FIG. 4 is a block diagram showing a database architecture that may be used to implement an embodiment of the present invention. The architecture comprises a user interface 410, a database server 412, and a database 414. Database server 412 interacts with the user via user interface 410, and accesses and maintains database 414 in accordance with the user input. Database server 412 may also interact with other systems (not shown).

In general, database server 412 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

Directory Links Table

In one embodiment of the invention, a directory links table includes a "parent row ID" column. For each row and corresponding node represented in the directory links table, the value of the "parent row ID" column indicates the row ID of the row in the directory links table of the node's parent in the file hierarchy. Whenever a node is added to the file hierarchy, the row ID of that node's parent is populated in the "parent row ID" column of that node's row. Whenever the parent of a node changes in the file hierarchy, the "parent row ID" column of that node's row is updated to indicate the row ID, in the directory links table, of that node's new parent. If the file system supports links, a resource can have multiple parents in which case an array of all parents is stored in the column "parent row ID."

In one embodiment of the invention, to determine whether a particular node is within a specified path of the file hierarchy, a database server derives the particular node's pathname by iteratively visiting, in a child-to-parent/bottom-to-top manner, child-parent links indicated in the directory links table and prepending, to the front of a pathname being constructed for the particular node, node names indicated in the visited rows.

This is similar to the technique described in the foregoing Background section. However, instead of scanning a B-tree index to locate a directory links table row that contains a parent node's file ID/OID, the database server quickly locates a parent node's row in the directory links table by using the value of the "parent row ID" column of the child node's row. As is discussed above, the value of the "parent row ID" column indicates the storage location, in the directory links table, of the parent node's row. Locating the parent node's row in this manner is significantly faster and more efficient than scanning the directory links table or a B-tree index for the row that contains the parent node's file ID. After the database server has derived the particular node's pathname, the database server compares the particular node's pathname with the specified path to determine whether the particular node exists within the specified path. The cost of locating the parent node's row using the parent row ID is independent of the size of the hierarchy, and therefore performs very well ever: for very large hierarchies.

Table 1 below illustrates an example directory links table that, according to one embodiment of the invention, includes a "parent row ID" column whose values indicate the storage locations of each node's parent's row in the directory links table.

TABLE 1

EXAMPLE DIRECTORY LINKS TABLE

| ROW ID | PARENT OID | CHILD OID | NODE NAME | PARENT ROW ID |
|---|---|---|---|---|
| R1 | X1 | X2 | Windows | R0 |
| R2 | X2 | X3 | Word | R1 |
| R3 | X3 | X4 | Example.doc | R2 |
| R4 | X2 | X5 | Access | R1 |
| R5 | X1 | X6 | Unix | R0 |
| R6 | X6 | X7 | App1 | R5 |
| R7 | X6 | X8 | App2 | R5 |
| R8 | X1 | X9 | VMS | R0 |
| R9 | X9 | X10 | App3 | R8 |
| R10 | X9 | X11 | App4 | R8 |
| R11 | X11 | X12 | Example.doc | R10 |

In order to derive the pathname for document 122 from Table 1, database server 412 initially locates the row whose child OID column indicates the OID that corresponds to document 122. In this example, the row whose child OD column indicates the OID that corresponds to document 122 is the row identified by row ID "R11". Database server 412 prepends row R11's indicated node name, "Example.doc", to the front of the pathname being derived.

Database server 412 determines that row R11's indicated parent row ID is "R10." Because each row in the database links table is stored at a storage location that corresponds to and is immediately ascertainable from that row's row ID, database server 412 directly locates row R10 using the indicated parent row ID. Database server 412 prepends row R10's indicated node name, "App4", and a separator, "/", to the front of the pathname being derived.

Database server 412 determines that row R10's indicated parent row ID is "R8." Database server 412 directly locates row R8 using the indicated parent row ID. Database server 412 prepends row R8's indicated node name, "VMS", and a separator, "/", to the front of the pathname being derived.

Database server 410 determines that row R8's indicated parent row ID is "R0." Database server 412 determines that row R0 corresponds to root directory 110. Therefore, database server 412 prepends a separator, "/", to the front of the pathname being derived. Thus, the full pathname for document 122 is "/VMS/App4/Example.doc". By comparing the string "/VMS/App4/Example.doc" to the string "/Windows", database server 410 determines that document 122 is not within the path "/Windows".

While in one embodiment of the invention, the parent row ID column is contained in the directory links table as described above, in an alternative embodiment, the parent row ID column is contained in a table that is separate from the directory links table.

Although the embodiment of the invention described above prepends node names to a pathname that is being derived, alternative embodiments of the invention may append node names to pathnames that are being derived instead, as will be seen below.

Caching Paths for Each Traversed Row

In one embodiment of the invention, whenever database server 412 derives a full pathname for a resource, database server 412 stores that pathname in a path cache. For example, a pathname may be indexed, in the path cache, by the OID of the resource; a cache entry containing the pathname for "/VMS/App4/Example.doc" may be indexed in the path cache by "X12", for example.

According to one embodiment of the invention, while traversing the rows of the directory links table as described above, whenever database server 412 determines that a cache entry for that row's node does not already exist in the path cache, database server 412 inserts a cache entry for that row's node into the path cache. The insertion of the cache entry may be performed as part of a recursive procedure after determining the pathname for the row's node's parent.

For example, a procedure may be implemented that determines whether a cache entry for a particular node exists in the path cache. If the cache entry exists, then the procedure returns the pathname indicated in the cache entry. Alternatively, if the cache entry does not exist, then the procedure (a) determines the particular node's parent using the database links table as described above, (b) recursively calls the procedure relative to the particular node's parent, (c) appends the particular node's name to the pathname returned by the recursively called procedure, (d) inserts, into the path cache, a cache entry indicating the pathname, and (e) returns the pathname.

For example, to determine a pathname for node X12, database server 412 may call the procedure described above, passing "X12" as a parameter to the first iteration of the procedure. The first iteration of the procedure determines whether a cache entry for node X12 exists in the path cache. Assuming that the path cache does not yet contain a cache entry for node X12, the first iteration of the procedure determines that the parent node of node X12 is node X11, and recursively calls the procedure, passing "X11" as a parameter to the second iteration of the procedure.

The second iteration of the procedure determines whether a cache entry for node X11 exists in the path cache. Assuming that the path cache does not yet contain a cache entry for node X11, the second iteration of the procedure determines that the parent node of node X11 is node X9, and recursively calls the procedure, passing "X9" as a parameter to the third iteration of the procedure.

The third iteration of the procedure determines whether a cache entry for node X9 exists in the path cache. Assuming that the path cache does not yet contain a cache entry for node X9, the third iteration of the procedure determines that the parent node of node X9 is node X1, and recursively calls the procedure, passing "X1" as a parameter to the fourth iteration of the procedure.

The fourth iteration of the procedure determines whether a cache entry for node X1 exists in the path cache. Assuming that the path cache does not yet contain a cache entry for node X1, the fourth iteration of the procedure determines that node X1 is the root node and has no parent. Therefore, the fourth iteration of the procedure appends node X1's name, "/", to the hitherto empty pathname. The fourth iteration of the procedure inserts, into the path cache, a cache entry that associates node X1 with the pathname "/". The fourth iteration of the procedure returns the pathname "/" to the procedure that called it (i.e., the third iteration of the procedure).

The third iteration of the procedure appends node X9's name, "VMS/", to the pathname returned by the fourth iteration (i.e., "/"), thereby forming the pathname "/VMS/". The third iteration of the procedure inserts, into the path cache, a cache entry that associates node X9 with the pathname "/VMS/". The third iteration of the procedure returns the pathname "/VMS/" to the procedure that called it (i.e., the second iteration of the procedure).

The second iteration of the procedure appends node X11's name, "App4/", to the pathname returned by the third iteration (i.e., "/VMS/"), thereby forming the pathname "/VMS/App4/". The second iteration of the procedure inserts, into the path cache, a cache entry that associates node X11 with the pathname "/VMS/App4/". The second iteration of the procedure returns the pathname "/VMS/App4/" to the procedure that called it (i.e., the first iteration of the procedure).

The first iteration of the procedure appends node X12's name, "Example.doc", to the pathname returned by the second iteration (i.e., "/VMS/App4/"), thereby forming the pathname "/VMS/App4/Example.doc". The first iteration of the procedure inserts, into the path cache, a cache entry that associates node X12 with the pathname "/VMS/App4/Example.doc". The first iteration of the procedure returns the pathname "/VMS/App4/Example.doc" to database server 412, which initially called the procedure.

Thus, in this example, after the full pathname "/VMS/App4/Example.doc" has been determined for node X12, the path cache contains cache entries for nodes X1, X9, X11, and X12.

Determining Pathnames Based on Cached Paths

At a later time, to determine a pathname for node X10, database server 412 may call the procedure described above, passing "X10" as a parameter to the first iteration of the procedure.

The first iteration of the procedure determines whether a cache entry for node X10 exists in the path cache. Assuming that the path cache does not yet contain a cache entry for node X10, the first iteration of the procedure determines that the parent node of node X10 is node X9, and recursively calls the procedure, passing "X9" as a parameter to the second iteration of the procedure.

The second iteration of the procedure determines whether a cache entry for node X9 exists in the path cache. In the present example, a cache entry for node X9 was inserted into the path cache during the previous determination of the pathname for node X12, discussed above. Therefore, the second iteration returns, to the procedure that called it (i.e., the first iteration of the procedure), the pathname that is contained in the cache entry associated with node X9 (i.e., "/VMS/").

The first iteration of the procedure appends node X10's name, "App3/", to the pathname returned by the second iteration (i.e., "/VMS/"), thereby forming the pathname "/VMS/App3/". The first iteration of the procedure inserts, into the path cache, a cache entry that associates node X10 with the pathname "/VMS/App3/". The first iteration of the procedure returns the pathname "/VMS/App3/" to database server 412, which initially called the procedure.

Thus, if a part of a pathname has been derived and cached before, then the full pathname may be derived using the cached part without determining every link in the corresponding path.

Figure 5:
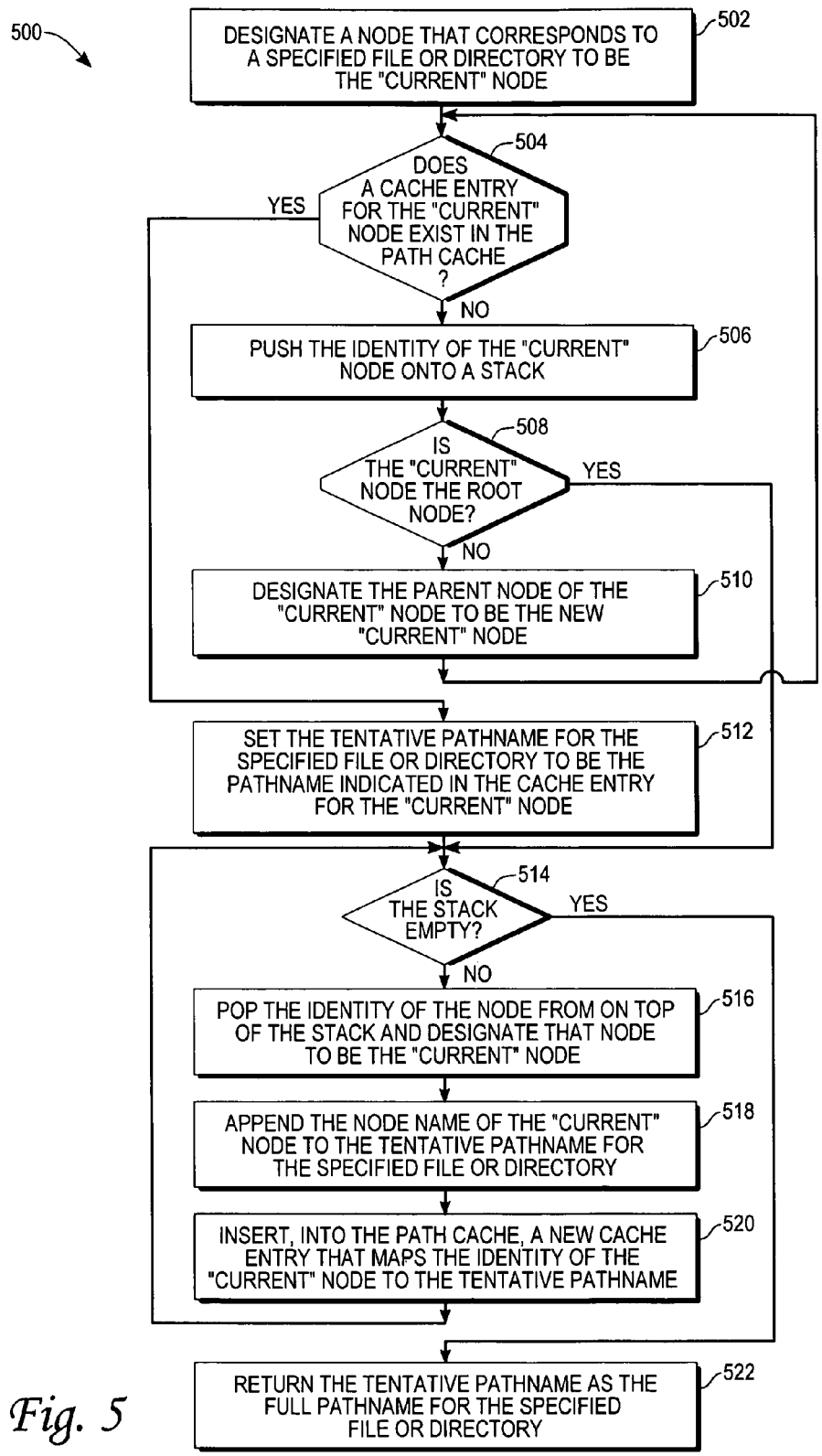
FIG. 5 shows a flow diagram illustrating a technique, according to an embodiment of the invention, for determining the full pathname for a specified file or directory.

Example Technique for Determining the Full Pathname for a Specified File or Directory FIG. 5 shows a flow diagram illustrating a technique 500, according to an embodiment of the invention, for determining the full pathname for a specified file or directory. For example, such a full pathname may be determined in response to a request to determine whether the specified file or directory occurs within a specified path. Database server 412 may perform technique 500, for example.

Referring to FIG. 5, in block 502, a node that corresponds to the specified file or directory is designated to be the "current" node.

In block 504, it is determined whether a cache entry for the "current" node exists in the path cache. If such a cache entry exists, then control passes to block 512. Otherwise, control passes to block 506.

In block 506, the identity of the "current" node is pushed onto a stack (initially, the stack is empty). In block 508, it is determined whether the "current" node is the root node. If the current node is the root node, then control passes to block 514. Otherwise, control passes to block 510.

In block 510, the parent node of the "current" node is designated as the new "current" node. For example, the parent node may be determined by referring to the directory links table, as described above. Control passes back to block 504.

Alternatively, in block 512, the tentative pathname for the specified file or directory is set to be the pathname indicated in the cache entry for the "current" node. Control passes to block 514.

In block 514, it is determined whether the stack referred to above in block 506 is empty. If the stack is empty, then control passes to block 522. Otherwise, control passes to block 516.

In block 516, the identity of the node on top of the stack is popped from the stack and designated as the "current" node. In block 518, the node name of the "current" node, as indicated in the directory links table, is appended to the tentative pathname for the specified file or directory. In block 520, a new cache entry for the "current" node is inserted into the path cache. The new cache entry associates the identity of the "current" node with the tentative pathname. Control passes back to block 514.

Alternatively, in block 522, the tentative pathname is returned as the full pathname for the specified file or directory.

Retaining the Most Important Information in the Path Cache

Because memory and persistent storage devices are limited in size, the path cache described above typically also will be limited in the number of cache entries that the cache can contain at one time. Therefore, in one embodiment of the invention, when a new cache entry is to be inserted into the path cache, if the path cache is full, then a cache eviction policy is consulted to determine which old cache entry should be removed for the path cache to make room for the new cache entry.

Typically, an effort to maintain certain "high retention importance" cache entries in the path cache should be made; in other words, cache entries having certain qualities should not be removed from the path cache unless there are no cache entries with less "retention importance" to remove. The "retention importance" of a cache entry may be a function of the likelihood that the presence of the cache entry in the path cache will result in a "cache hit."

Usually, cache entries that correspond to nodes that are located toward the root of a node hierarchy should be maintained in the path cache. These cache entries are more likely to be useful when attempting to complete a path-determining operation, because a greater number of other nodes are likely to be descendants of the nodes to which those cache entries correspond. Therefore, in one embodiment of the invention, the distance of a cache entry's node from the root node, which may be measured by the number of nodes that intervene between the cache entry's node and the root node, is at least one factor considered when determining whether that cache entry should be evicted from the path cache.

Additionally, there is a natural tendency for multiple path-based operations that occur closely to each other in a temporal sense to involve the same nodes and paths. For this reason, retaining recently or frequently accessed cache entries in the path cache can be beneficial. Therefore, in one embodiment of the invention, the amount of time that has passed since a cache entry was last accessed, and/or the number of times that the cache entry has been accessed, are factors considered when determining whether that cache entry should be evicted from the path cache. In one embodiment of the invention, a cache entry is considered to be "accessed" only when that cache entry's node is the subject of a path-based operation (e.g., when the cache entry's node is the specified file or directory for which a full pathname was requested). In other embodiments of the invention, a cache entry is considered to be "accessed" whenever that cache entry is read during a path-determining operation.

Therefore, according to one embodiment of the invention, in addition to the information discussed above, each cache entry in the path cache also indicates (a) a number of nodes that separate that cache entry's node from the root node in the hierarchy, (b) a timestamp that indicates the last time that the cache entry was accessed, and (c) a number of times that the cache entry has been accessed since being inserted into the path cache. Each time that a cache entry is accessed during a path-determining operation as described above, the number of times that the cache entry has been accessed is incremented.

In one embodiment of the invention, each cache entry indicates the number of other nodes that currently descend, directly or indirectly, from that cache entry's node in the hierarchy. In such an embodiment, whenever a particular node is added to or removed from the hierarchy, the numbers of "descendant" nodes of each of the particular node's "ancestor" nodes is updated to reflect the addition or removal of the particular node. The number of other nodes that descend from a cache entry's node is indicative of that cache entry's node's importance.

In one embodiment of the invention, whenever a cache entry needs to be evicted from the path cache—such as whenever the path cache is full and a new cache entry needs to be inserted—an importance score is generated for each cache entry in the path cache. Each cache entry's score is based at least in part on one or more items of information indicated in that cache entry as described above. The cache entry with the importance score that indicates the least degree of importance is then evicted from the path cache. Different embodiments of the invention may incorporate different factors in determining importance scores.

For example, in one embodiment of the invention, each cache entry's score is computed, at least in part, by dividing (a) the number of other nodes that descend, directly or indirectly, from that cache entry's node by (b) the total number of nodes in the hierarchy. In one embodiment of the invention, the resulting quotient is multiplied by one or more of (a) the number of times that the cache entry has been accessed, and (b) the number of time units (e.g., minutes) that have passed since the cache entry was last accessed. In such an embodiment of the invention, a higher score indicates a greater importance and a greater need to maintain the associated cache entry in the path cache. Other formulations of the importance score, not expressly recited herein, are possible, and should not be considered to be outside of the scope of embodiments of the invention.

Hardware Overview

Figure 6:
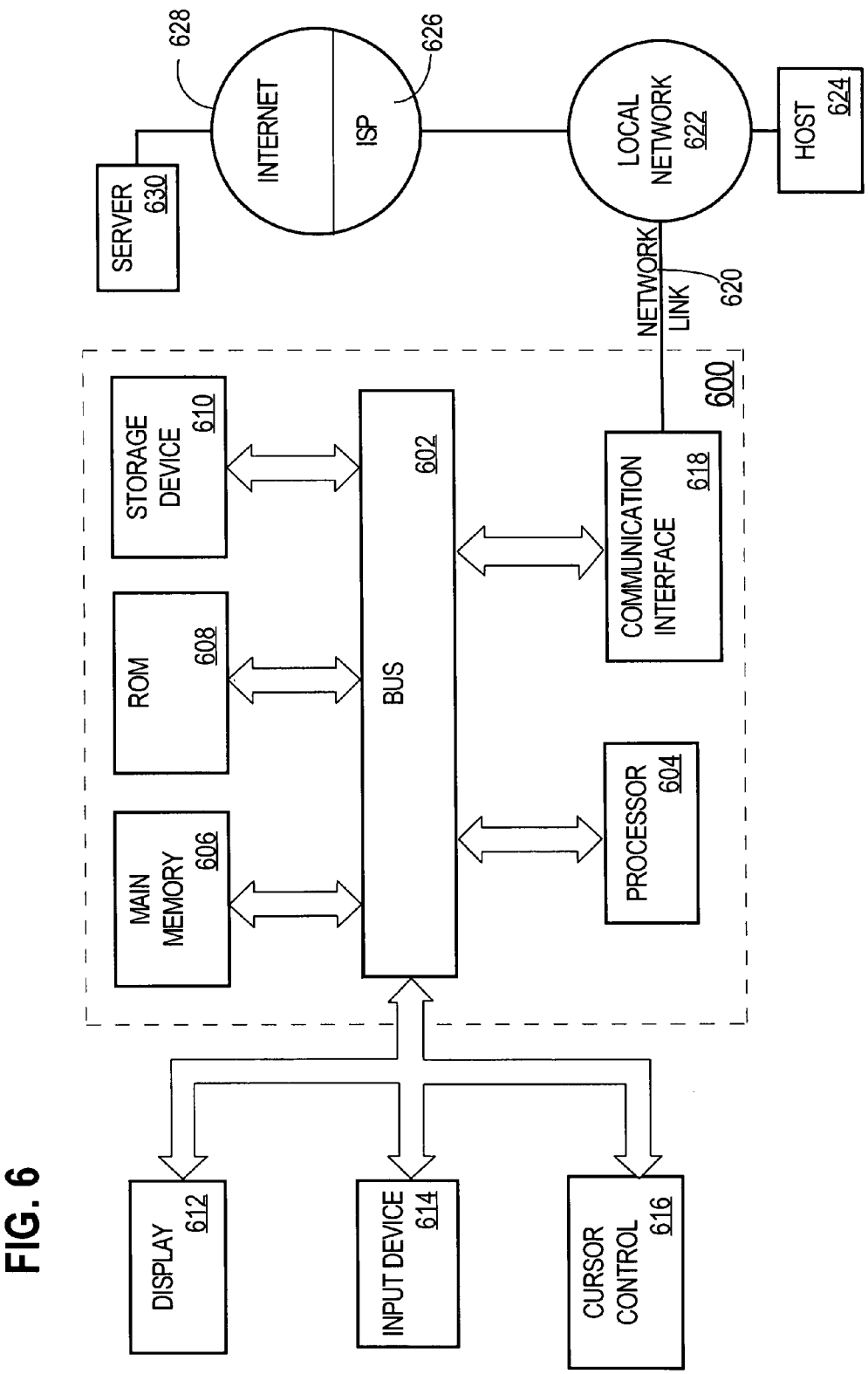
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of processing path-based operations, the method comprising:
  in response to a request to determine a complete path to a requestor-specified first node, and upon determining that a path cache does not contain a first cache entry that specifies a complete path from a root node to the first node, which is an immediate child of a second node in a hierarchy of nodes, determining whether the path cache contains a second cache entry that specifies a complete path from the root node to the second node;
  upon determining that the path cache does not contain the second cache entry, automatically determining a pathname that specifies the complete path from the root node to the second node and inserting, into the path cache, a particular cache entry that (a) corresponds to the second node and (b) indicates the pathname for the second node;
  storing, in the particular cache entry, a first value that indicates a quantity of nodes that descend from the second node in the hierarchy; and
  in response to a determination that at least one cache entry is to be evicted from the path cache, selecting the particular cache entry for eviction from the path cache based at least in part on the first value;
  wherein the method is performed by one or more computing devices.

2. The method of claim 1, wherein the step of determining whether the path cache contains the second cache entry is performed in response to an execution, relative to a relational database, of a Structured Query Language (SQL) query whose results depend at least in part on the pathname.

3. The method of claim 1, wherein the step of determining whether the path cache contains the second cache entry is performed in response to an execution, relative to a relational database, of a Structured Query Language (SQL) query whose results depend at least in part on a determination of whether the first node is within a specified path in the hierarchy of nodes.

4. The method of claim 1, further comprising:
  locating, in a relational database table, a first row that corresponds to the first node; and
  locating, in the first row, an attribute that identifies a location, in the database table, of a second row that corresponds to the second node.

5. The method of claim 1, further comprising:
  storing, in the particular cache entry, a second value that indicates a quantity of nodes that separate the second node from the root node in the hierarchy; and
  in response to the determination that at least one cache entry is to be evicted from the path cache, selecting the particular cache entry for eviction from the path cache based at least in part on the second value.

6. The method of claim 5, wherein cache entries with higher second values are more likely to be selected for eviction than cache entries with lower second values.

7. The method of claim 1, further comprising:
  in response to a descendant of the second node being added to or removed from the hierarchy, updating the first value in the particular cache entry.

8. The method of claim 1, further comprising:
  in response to the determination that at least one cache entry is to be evicted from the path cache, selecting the particular cache entry for eviction from the path cache based at least in part on a value produced by dividing the first value by a total number of nodes in the hierarchy.

9. The method of claim 1, wherein the step of automatically determining the pathname that specifies the complete path from the root node to the second node further comprises:
  determining the complete path from the root node to the second node based at least in part on information contained in a directory links table that contains, for at least one node in the hierarchy, an array storing multiple row identifiers of multiple parents of said at least one node in the hierarchy.

10. The method of claim 1, wherein cache entries with lower first values are more likely to be selected for eviction than cache entries with higher first values.

11. A volatile or non-volatile non-transitory computer-readable storage medium storing one or more sequences of instructions which, when executed by one or more processors, causes the one or more processors to perform steps comprising:
  in response to a request to determine a complete path to a requestor-specified first node, and upon determining that a path cache does not contain a first cache entry that specifies a complete path from a root node to the first node, which is an immediate child of a second node in a hierarchy of nodes, determining whether the path cache contains a second cache entry that specifies a complete path from the root node to the second node;
  upon determining that the path cache does not contain the second cache entry, automatically determining a pathname that specifies the complete path from the root node to the second node and inserting, into the path cache, a particular cache entry that (a) corresponds to the second node and (b) indicates the pathname for the second node;
  storing, in the particular cache entry, a first value that indicates a quantity of nodes that descend from the second node in the hierarchy; and
  in response to a determination that at least one cache entry is to be evicted from the path cache, selecting the particular cache entry for eviction from the path cache based at least in part on the first value.

12. The computer-readable medium of claim 11, wherein the step of determining whether the path cache contains the second cache entry is performed in response to an execution, relative to a relational database, of a Structured Query Language (SQL) query whose results depend at least in part on the pathname.

13. The computer-readable medium of claim 11, wherein the step of determining whether the path cache contains the second cache entry is performed in response to an execution, relative to a relational database, of a Structured Query Language (SQL) query whose results depend at least in part on a determination of whether the first node is within a specified path in the hierarchy of nodes.

14. The computer-readable medium of claim 11, wherein the steps further comprise:
  locating, in a relational database table, a first row that corresponds to the first node; and
  locating, in the first row, an attribute that identifies a location, in the database table, of a second row that corresponds to the second node.

15. The computer-readable medium of claim 11, wherein the steps further comprise:

storing, in the particular cache entry, a second value that indicates a quantity of nodes that separate the second node from the root node in the hierarchy; and in response to the determination that at least one cache entry is to be evicted from the path cache, selecting the particular cache entry for eviction from the path cache based at least in part on the second value.

16. The computer-readable medium of claim 15, wherein cache entries with higher second values are more likely to be selected for eviction than cache entries with lower second values.

17. The computer-readable medium of claim 11, wherein the steps further comprise:

in response to a descendant of the second node being added to or removed from the hierarchy, updating the first value in the particular cache entry.

18. The computer-readable medium of claim 11, wherein the steps further comprise:

in response to the determination that at least one cache entry is to be evicted from the path cache, selecting the particular cache entry for eviction from the path cache based at least in part on a value produced by dividing the first value by a total number of nodes in the hierarchy.

19. The computer-readable medium of claim 11, wherein the step of automatically determining the pathname that specifies the complete path from the root node to the second node further comprises:

determining the complete path from the root node to the second node based at least in part on information contained in a directory links table that contains, for at least one node in the hierarchy, an array storing multiple row identifiers of multiple parents of said at least one node in the hierarchy.

20. The computer-readable medium of claim 11, wherein cache entries with lower first values are more likely to be selected for eviction than cache entries with higher first values.

* * * * *

UNITED STATES PATENT AND TRADEMARK OFFICE
CERTIFICATE OF CORRECTION

PATENT NO. : 8,949,455 B2
APPLICATION NO. : 11/284521
DATED : February 3, 2015
INVENTOR(S) : Idicula et al.

It is certified that error appears in the above-identified patent and that said Letters Patent is hereby corrected as shown below:

In the Specification

In column 8, line 7, delete "ever:" and insert -- even --, therefor.

Signed and Sealed this
Twelfth Day of July, 2016

Michelle K. Lee
*Director of the United States Patent and Trademark Office*